US012655909B2

(12) United States Patent
Yoshida et al.

(10) Patent No.: US 12,655,909 B2
(45) Date of Patent: Jun. 16, 2026

(54) SEAL DEVICE, ROTATING MACHINE, AND METHOD FOR MOUNTING SEAL DEVICE

(71) Applicant: MITSUBISHI HEAVY INDUSTRIES, LTD., Tokyo (JP)

(72) Inventors: Azumi Yoshida, Tokyo (JP); Ryuji Iwamoto, Tokyo (JP); Hideo Yamamoto, Tokyo (JP); Masaya Kawano, Tokyo (JP); Shin Nishimoto, Tokyo (JP); Tatsuro Furusho, Tokyo (JP); Shintaro Okumura, Tokyo (JP); Kenichi Sakashita, Tokyo (JP); Tsutomu Ogino, Tokyo (JP); Seemin Daryl Soh, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/683,354

(22) PCT Filed: Jan. 13, 2023

(86) PCT No.: PCT/JP2023/000722
§ 371 (c)(1),
(2) Date: Feb. 13, 2024

(87) PCT Pub. No.: WO2023/157519
PCT Pub. Date: Aug. 24, 2023

(65) Prior Publication Data
US 2025/0137533 A1 May 1, 2025

(30) Foreign Application Priority Data
Feb. 18, 2022 (JP) ................................. 2022-023470

(51) Int. Cl.
*F16J 15/44* (2006.01)
*F01D 11/02* (2006.01)

(52) U.S. Cl.
CPC ............. *F16J 15/445* (2013.01); *F01D 11/02* (2013.01); *F01D 11/025* (2013.01); *F16J 15/441* (2013.01)

(58) Field of Classification Search
CPC .... F01D 11/02; F01D 11/025; F05D 2240/55; F02C 7/28; F16J 15/441; F16J 15/442; F16J 15/445; F16J 15/4472
See application file for complete search history.

(56) References Cited

U.S. PATENT DOCUMENTS

| | | | | |
|---|---|---|---|---|
| 6,572,115 B1 * | 6/2003 | Sarshar | ................ | F16J 15/3288 |
| | | | | 277/412 |
| 6,840,519 B2 * | 1/2005 | Dinc | ...................... | F16J 15/445 |
| | | | | 277/303 |

(Continued)

FOREIGN PATENT DOCUMENTS

| | | | | | |
|---|---|---|---|---|---|
| CN | 106661954 A | * | 5/2017 | ............ | F01D 11/025 |
| CN | 111075928 A | | 4/2020 | | |

(Continued)

OTHER PUBLICATIONS

International Search Report dated Mar. 28, 2023, issued in counterpart Application No. PCT/JP2023/000722. (11 pages).

(Continued)

*Primary Examiner* — Nicholas L Foster
(74) *Attorney, Agent, or Firm* — WHDA, LLP

(57) ABSTRACT

A seal device, includes: a seal member disposed between a rotating part and a stationary part of a rotating machine in a radial direction of the rotating machine; and a retention member for supporting the seal member movably along the radial direction, the retention member being at least partially accommodated in a groove disposed in the stationary part so as to extend along a circumferential direction. The retention member has: a base portion accommodated in the groove; and a protruding portion protruding radially inward from the (Continued)

base portion. The seal member has a sliding surface which is adjacent to the protruding portion in an axial direction and is slidable on the protruding portion.

10 Claims, 7 Drawing Sheets

(56)                References Cited

U.S. PATENT DOCUMENTS

| | | | | |
|---|---|---|---|---|
| 7,704,041 | B2 * | 4/2010 | Adis | F01D 11/003 |
| | | | | 277/421 |
| 7,731,478 | B2 * | 6/2010 | Chevrette | F16J 15/442 |
| | | | | 415/173.5 |
| 10,215,044 | B2 * | 2/2019 | Zhang | F16J 15/445 |
| 10,746,040 | B2 * | 8/2020 | Nogami | F01D 11/003 |
| 11,174,743 | B2 * | 11/2021 | Thomas | F01D 5/3084 |
| 11,525,405 | B2 * | 12/2022 | Ha | F02C 3/04 |
| 12,140,035 | B2 * | 11/2024 | Vitt | F01D 11/16 |
| 2006/0067815 | A1 | 3/2006 | Ghasripoor et al. | |
| 2007/0237628 | A1 * | 10/2007 | Adis | F16J 15/441 |
| | | | | 415/170.1 |
| 2011/0309585 | A1 * | 12/2011 | Uehara | F16J 15/4472 |
| | | | | 277/352 |
| 2012/0211944 | A1 * | 8/2012 | Nishimoto | F16J 15/442 |
| | | | | 277/422 |
| 2017/0145847 | A1 * | 5/2017 | Zhang | F01D 11/003 |
| 2019/0292928 | A1 * | 9/2019 | Nogami | F01D 19/00 |
| 2022/0025819 | A1 * | 1/2022 | Ha | F01D 9/04 |
| 2023/0258268 | A1 * | 8/2023 | Mitsumata | F16J 15/447 |
| | | | | 277/412 |
| 2025/0035006 | A1 * | 1/2025 | Furusho | H03H 3/08 |

FOREIGN PATENT DOCUMENTS

| | | |
|---|---|---|
| JP | 2006-105393 A | 4/2006 |
| JP | 2006-132691 A | 5/2006 |
| JP | 3187394 U | 11/2013 |
| JP | 2018-141527 A | 9/2018 |

OTHER PUBLICATIONS

Notification Concerning Transmittal of International Preliminary Report on Patentability (Forms PCT/IB/326) issued in counterpart International Application No. PCT/JP2023/000722 mailed Aug. 29, 2024, with Forms PCT/IB/373, PCT/IB/338 and PCT/ISA/237. (12 pages).

* cited by examiner

FIG. 4

AXIAL DIRECTION

RADIAL DIRECTION

10

30

32

4

34

66(63)

35

22

64(63)

20

AXIAL DIRECTION

SEAL DEVICE, ROTATING MACHINE, AND METHOD FOR MOUNTING SEAL DEVICE

TECHNICAL FIELD

The present disclosure relates to a seal device, a rotating machine, and a method for mounting the seal device.

The present application claims priority based on Japanese Patent Application No. 2022-023470 filed on Feb. 18, 2022, the entire content of which is incorporated herein by reference.

BACKGROUND ART

As a seal device to reduce fluid leakage through a gap between a rotating part and a stationary part of a rotating machine such as a gas turbine and a steam turbine, a seal device with a structure that allows a seal member to move along the radial direction according to the operating conditions of the rotating machine is sometimes used.

Patent Document 1 discloses a shaft seal device disposed between a rotor (rotating part) and a stator (stationary part) and equipped with a movable seal member that can move along the radial direction. The movable seal member is partially accommodated in a groove in a housing (stationary part) fixed to the stator and is biased radially outward by an elastic member.

In the shaft seal device of Patent Document 1, during start-stop operation or during stop of the rotating machine, the movable seal member is biased radially outward by the elastic member to keep the clearance between the rotor and the movable seal member large. On the other hand, during load operation of the rotating machine, the pressure of the working fluid on the high pressure side acts on the outer peripheral surface of the movable seal member, so that a radially inward force (i.e., a force against the biasing force of the elastic member) is applied to the movable seal member. As a result, the movable seal member is displaced radially inward compared to during start-stop operation, etc., and the clearance between the rotor and the movable seal member is kept small.

CITATION LIST

Patent Literature

Patent Document 1: JP2018-141527A

SUMMARY

Problems to be Solved

In the seal device described in Patent Document 1, the movable seal member is partially accommodated in the groove of the stationary part of the rotating machine, and the seal member and the stationary part slide against each other when the seal member moves along the radial direction. As this sliding motion is repeated, wear occurs on the sliding surfaces of the seal member and the stationary part, and the condition of the sliding surfaces (friction coefficient, etc.) changes from a desired state. If the sliding surfaces change from the desired state, the operation of the movable seal member may deviate from expectations, such as the movable seal member not moving at the intended timing, and the operation of the seal device may become unstable. As a result, this may lead to reduced efficiency of the rotating machine and increased risk of contact between the seal member and the rotating part.

In view of the above, an object of at least one embodiment of the present disclosure is to provide a seal device, a rotating machine, and a method for mounting the seal device that can easily maintain stable operation of the seal device including a movable seal member.

Solution to the Problems

A seal device according to at least one embodiment of the present invention includes: a seal member disposed between a rotating part and a stationary part of a rotating machine in a radial direction of the rotating machine; and a retention member for supporting the seal member movably along the radial direction, the retention member being at least partially accommodated in a groove disposed in the stationary part so as to extend along a circumferential direction. The retention member has: a base portion accommodated in the groove; and a protruding portion protruding radially inward from the base portion. The seal member has a sliding surface which is adjacent to the protruding portion in an axial direction and is slidable on the protruding portion.

Further, a rotating machine according to at least one embodiment of the present invention includes: a rotating part and a stationary part; and the above-described seal device for reducing leakage of a fluid between the rotating part and the stationary part.

Further, a mounting method for a seal device according to at least one embodiment of the present invention is a method for mounting the above-described seal device on a rotating machine including a rotating part and a stationary part, including a step of inserting the retention member in the groove disposed in the stationary part along a circumferential direction in a state where the seal member is assembled on the retention member.

Advantageous Effects

At least one embodiment of the present disclosure provides a seal device, a rotating machine, and a method for mounting the seal device that can easily maintain stable operation of the seal device including a movable seal member.

BRIEF DESCRIPTION OF DRAWINGS

FIG. 4 is a schematic enlarged view of a sliding portion of the seal device according to an embodiment.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

(Configuration of Rotating Machine)

Figure 1:
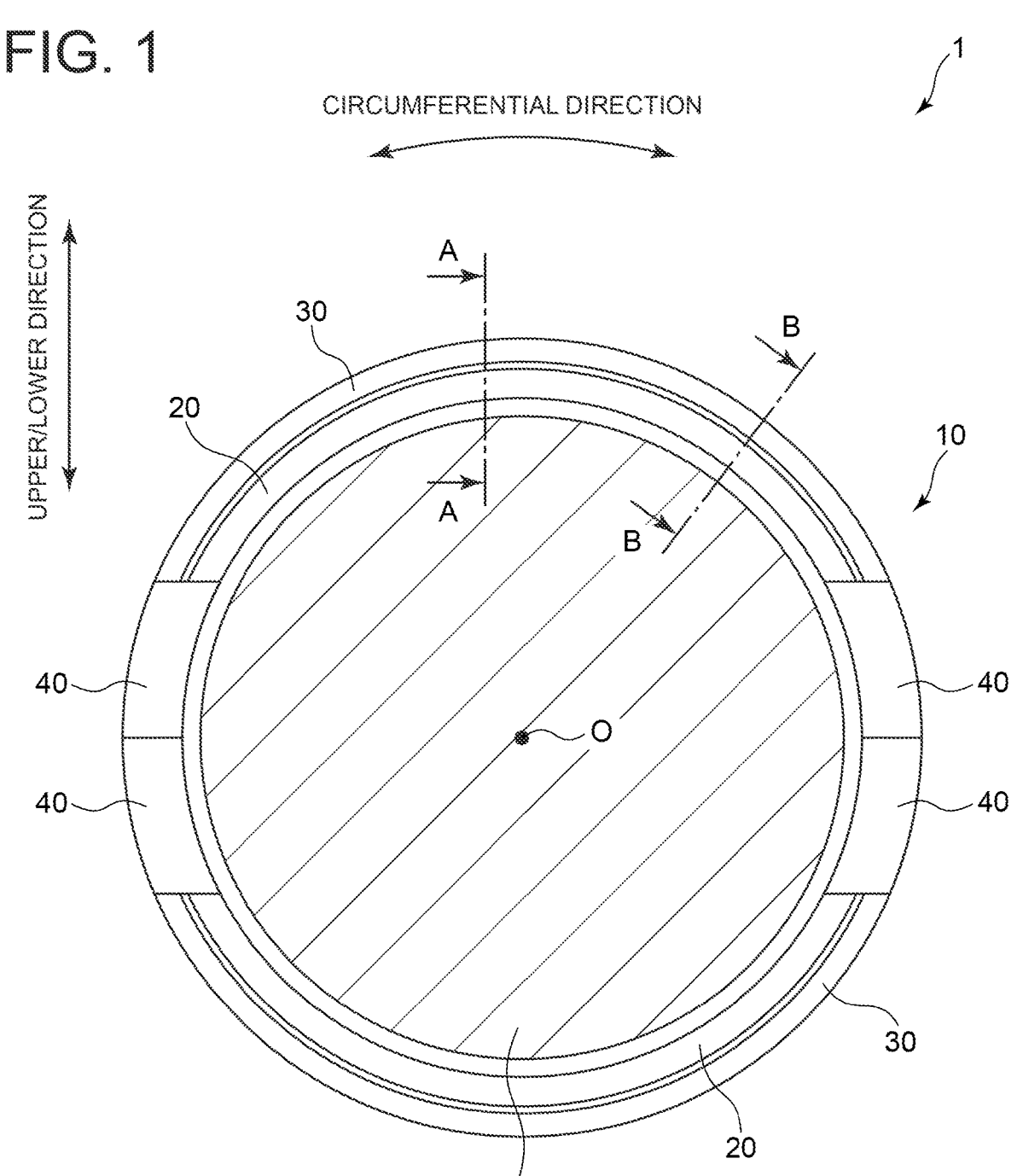
FIG. 1 is a partial schematic cross-sectional view of a rotating machine according to an embodiment.
Figure 2A:
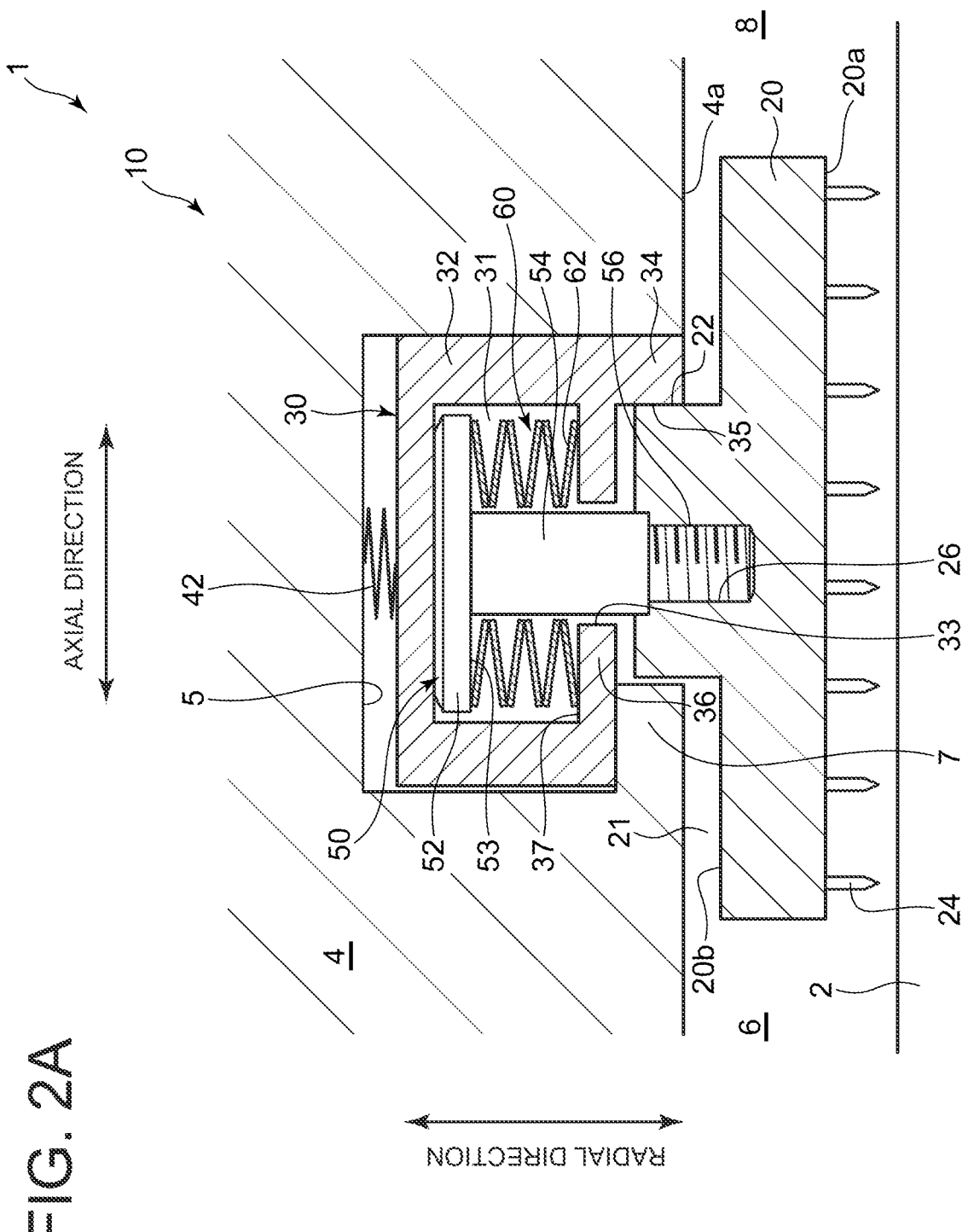
FIG. 2A is a schematic cross-sectional view of a seal device according to an embodiment, taken along A-A in FIG. 1.
Figure 2B:
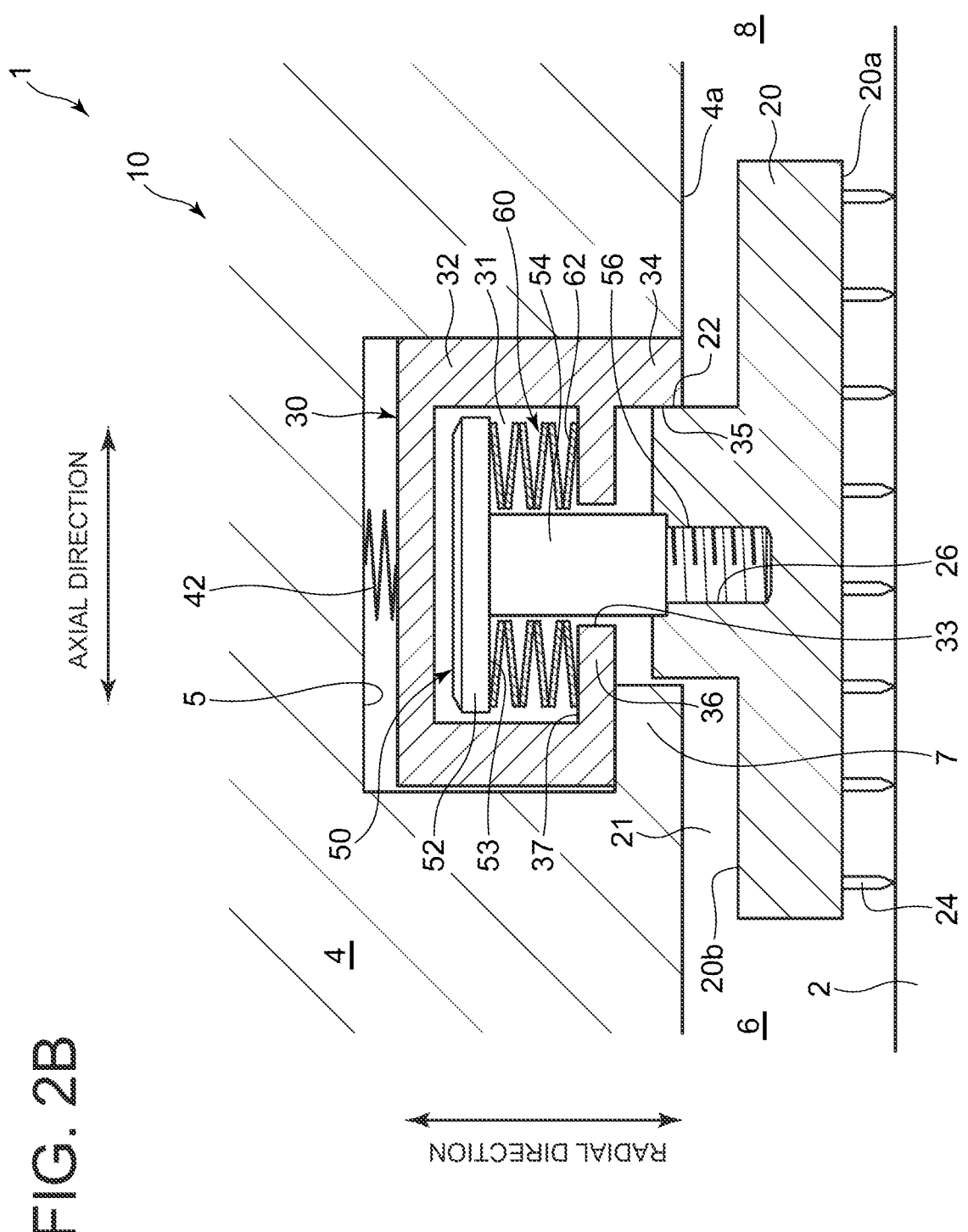
FIG. 2B is a schematic cross-sectional view of a seal device according to an embodiment, taken along A-A in FIG. 1.
Figure 3A:
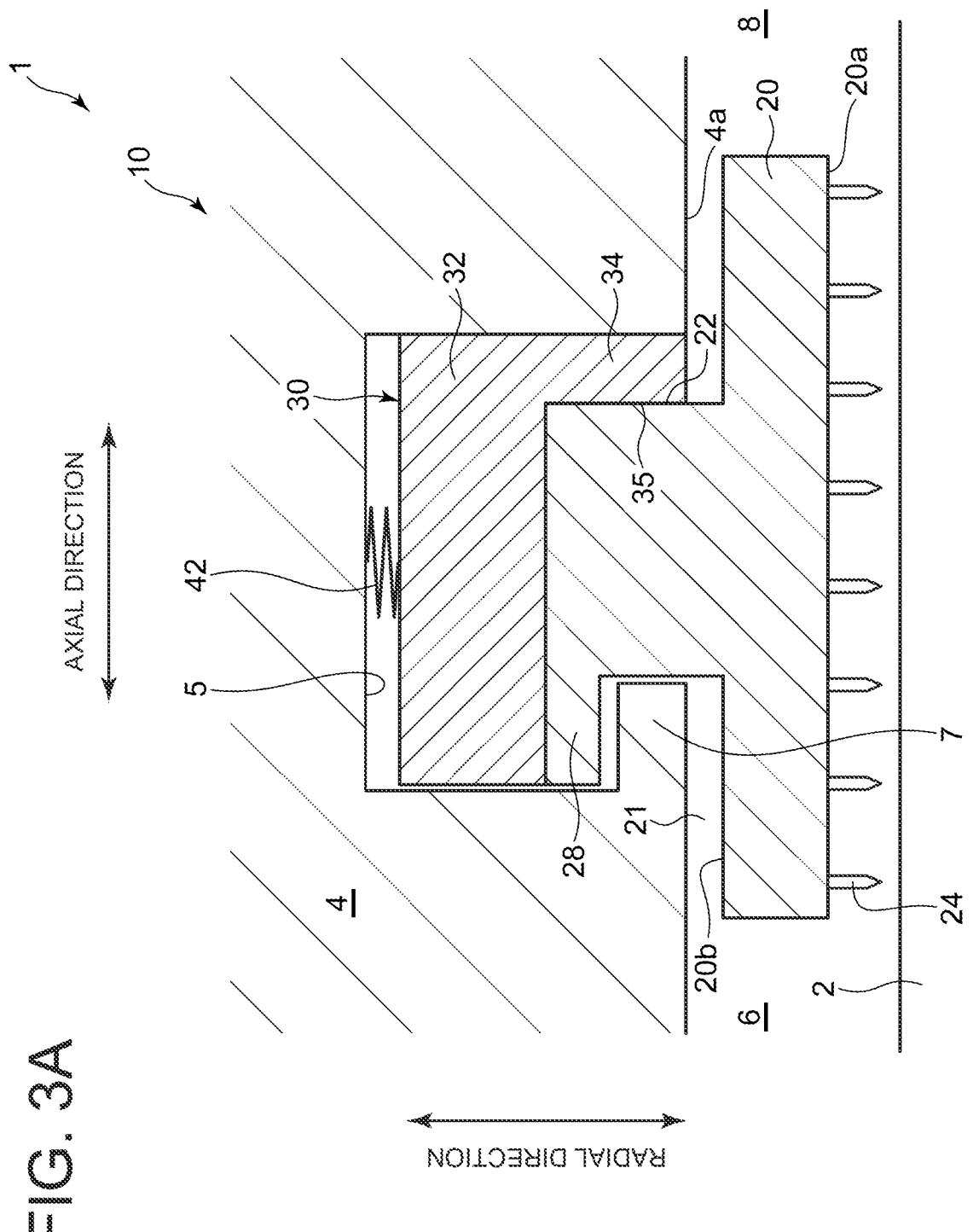
FIG. 3A is a schematic cross-sectional view of a seal device according to an embodiment, taken along B-B in FIG. 1.
Figure 3B:
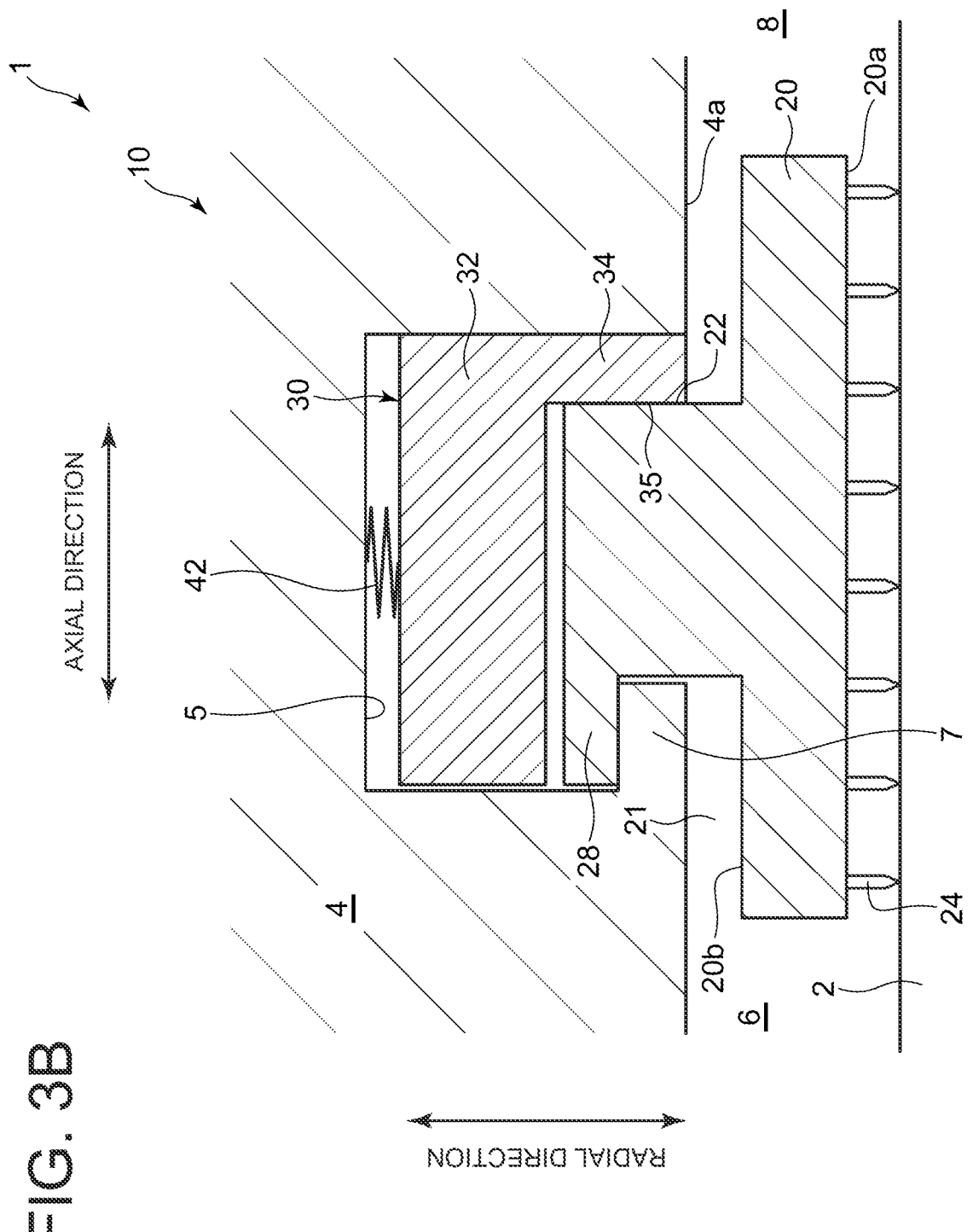
FIG. 3B is a schematic cross-sectional view of a seal device according to an embodiment, taken along B-B in FIG. 1.

FIG. 1 is a partial schematic cross-sectional view of a rotating machine according to an embodiment perpendicular to the axial direction of the rotating machine. FIGS. 2A and 2B are a schematic cross-sectional view of a seal device according to an embodiment, taken along A-A in FIG. 1. FIGS. 3A and 3B are a schematic cross-sectional view of a seal device according to an embodiment, taken along B-B in FIG. 1. Here, FIGS. 2A and 3A show the seal device during start-stop operation of the rotating machine. FIGS. 2B and 3B show the seal device during load operation of the rotating machine.

The rotating machine according to some embodiments is a fluid machine such as a turbine (gas turbine or steam turbine), a compressor, or a pump. As shown in FIGS. 1 to 3B, a rotating machine 1 according to an embodiment includes a rotating part 2 (rotor) and a stationary part 4 (not shown in FIG. 1) disposed on the outer peripheral side of the rotating part 2. The rotating part 2 is rotatably supported around the central axis O by a bearing (not shown). The stationary part 4 includes a casing for housing the rotating part 2 and a stationary member supported by the casing. The stationary part 4 may include a blade ring for supporting stator vanes, or a stationary member (for example, dummy ring, retaining ring, etc.) for supporting seal members or the like.

Between the rotating part 2 and the stationary part 4 in the radial direction of the rotating machine 1, fluid passages (typically, annular passages) are formed. As shown in FIGS. 2A to 3B, the rotating machine 1 includes a high-pressure portion 6 including, of the above-described fluid passages, a passage through which a fluid with relatively high-pressure flows, and a low-pressure portion 8 including a passage through which a fluid with lower pressure than the fluid in the high-pressure portion 6 flows. The high-pressure portion 6 and the low-pressure portion 8 are offset from each other in the axial direction (the direction of the central axis O).

The rotating machine 1 further includes a seal device 10 to reduce fluid leakage through a gap between the rotating part 2 and the stationary part 4. Hereinafter, the seal device 10 according to some embodiments will be described in more detail.

(Configuration of Seal Device)

As shown in FIGS. 1 to 3B, the seal device 10 includes a movable seal member 20 (seal member) disposed between the rotating part 2 and the stationary part 4 in the radial direction of the rotating machine 1, and a retention member 30 for supporting the movable seal member 20 movably along the radial direction. In an embodiment, as shown in FIG. 1, the movable seal member 20 and the retention member 30 extend along the circumferential direction. That is, the movable seal member 20 and the retention member 30 may have a circular or ring shape.

In some embodiments, for example, as shown in FIG. 1, the seal device 10 may include a fixed seal member 40 disposed adjacent to the movable seal member 20 in the circumferential direction. The fixed seal member 40 is basically configured not to move along the radial direction. In the exemplary embodiment shown in FIG. 1, the seal device 10 includes movable seal members 20 disposed above and below the rotating part 2 in the upper/lower direction (vertical direction), and a plurality of fixed seal members 40 disposed on the side of the rotating part 2 adjacent to the end portions of the movable seal members 20 in the circumferential direction.

As shown in FIGS. 2A to 3B, the movable seal member 20 is disposed between the high-pressure portion 6 and the low-pressure portion 8 in the axial direction of the rotating machine 1. In the exemplary embodiment shown in FIGS. 2A to 3B, a plurality of seal fins 24 are provided on a surface 20a (inner peripheral surface) of the movable seal member 20 that faces the rotating part 2. In some embodiments, a plurality of seal fins may be provided on the outer peripheral surface (i.e., the surface that faces the movable seal member 20) of the rotating part 2.

The movable seal member 20 has an outer peripheral surface 20b that faces the stationary part 4, and a gap 21 that can communicate with the high-pressure portion 6 is formed between the outer peripheral surface 20b and the stationary part 4 in the radial direction. That is, the pressure of the fluid from the high-pressure portion 6 acts on the outer peripheral surface 20b of the movable seal member 20.

The retention member 30 is at least partially accommodated in a groove 5 disposed in the stationary part 4 so as to extend along the circumferential direction. The groove 5 is disposed so as to be recessed radially outward from the inner peripheral surface 4a of the stationary part 4. The groove 5 may be disposed in a casing (stationary part 4) for housing the rotating part 2 or in a stationary member (stationary part 4) supported by the casing. The groove 5 may be disposed, for example, in a dummy ring (stationary part 4) of a steam turbine or in a retaining ring (stationary part 4) of a gas turbine. In the exemplary embodiment shown in FIGS. 2A to 3B, the retention member 30 includes a base portion 32 accommodated in the groove 5, and a protruding portion 34 protruding radially inward from the base portion 32.

The axial length of the portion of the retention member 30 that is accommodated in the groove 5 (the axial length of the base portion 32 in the illustrated embodiment) is slightly shorter than the axial length of the groove 5. Accordingly, the groove 5 positions the retention member 30 in the axial direction with an axial space between the groove 5 and the retention member 30.

The retention member 30 has, in at least a partial region in the circumferential direction (for example, the portion shown in FIGS. 2A and 2B), a contact portion 36 which contacts an axially protruding portion 7 of the stationary part 4 protruding in the axial direction in the groove 5. Further, in the groove 5, a biasing member 42 may be disposed radially outward of the retention member 30 and radially inward of the stationary part 4 to bias the retention member 30 radially inward. The retention member 30 may be positioned in the radial direction by the biasing member 42 biasing the retention member 30 radially inward and the contact portion 36 contacting the axially protruding portion 7 to restrict the position of the retention member in the radial direction.

In some embodiments, for example, as shown in FIGS. 2A and 2B, the seal device 10 includes a head part 52 accommodated in the retention member 30, and a shaft part 54 extending along the radial direction and connecting the head part 52 and the movable seal member 20. The movable seal member 20 is supported by the retention member 30 movably along the radial direction via the shaft part 54 and the head part 52 connected to the movable seal member 20. The head part 52 is accommodated in an accommodation space 31 disposed in the retention member 30. The shaft part 54 is disposed so as to pass through a hole 33 provided in the retention member 30 and communicate with the accommodation space 31. In the exemplary embodiment shown in FIGS. 2A and 2B, the seal device 10 includes a bolt part 50, and the head part 52 and the shaft part 52 are parts of the bolt part 50. In some embodiments, the head part 52 and the shaft part 54 may be composed of separate members. The head part 52 and/or the shaft part 54 may include pins.

Here, the axial length of the hole 33 is smaller than the diameter of the head part 52 and larger than the diameter of the shaft part 54. Further, the radial length of the accommodation space 31 is longer than the radial length of the head part 52. Accordingly, while preventing the head part 52 from slipping out of the accommodation space 31, the head part 52 and the shaft part 54 (bolt part 50) can move along the radial direction inside the accommodation space 31, and the movable seal member 20, which is connected to the shaft part 54 (bolt part 50), can move along the radial direction together with the head part 52 and the shaft part 54 (bolt part 50). As shown in FIGS. 2A and 2B, the shaft part 54 may have one end portion with a thread 56 and be screwed into a threaded hole 26 provided in the movable seal member 20. In some embodiments, the shaft part 54 (e.g., pin) may be connected to the movable seal member 20 by shrink fitting, welding, or the like.

In some embodiments, the head parts 52 and the shaft parts 54 (bolt parts 50) may be provided at multiple positions in the circumferential direction.

In some embodiments, the seal device 10 may include a biasing member 60 accommodated in the retention member 30 and configured to bias the movable seal member 20 radially outward against the retention member 30 along the radial direction (see FIGS. 2A and 2B). As shown in FIGS. 2A and 2B, the biasing member 60 may be disposed between a radially inward-facing surface 53 of the head part 52 and a radially outward-facing surface 37 of an inner wall surface of the retention member 30 forming the accommodation space 31. In the exemplary embodiment shown in FIGS. 2A and 2B, the biasing member 60 includes a plurality of disc springs 62.

In some embodiments, the biasing members 60 may be provided at multiple positions in the circumferential direction.

At the position where the biasing member 60 or the head part 52 and the shaft part 54 (bolt portion 50) are not provided in the circumferential direction, for example, as shown in FIGS. 3A and 3B, the movable seal member 20 may be partially accommodated in the groove 5 of the stationary part 4. The movable seal member 20 may include an engagement portion 28 disposed in the radial direction between the base portion 32 of the retention member 30 and the axially protruding portion 7 of the stationary part 4 and capable of engaging the axially protruding portion 7. As shown in FIG. 3B, the engagement portion 28 is engaged with the axially protruding portion 7 when the movable seal member 20 is located on the radially inner side.

Here, the operation of the above-described seal device 10 will be described briefly. During start-stop operation or during stop of the rotating machine 1, the movable seal member 20 is biased radially outward by the biasing member 60 to keep the clearance between the rotating part 2 and the movable seal member 20 (or seal fin 24) large (see FIGS. 2A and 3A). When the load of the rotating machine 1 increases, the pressure difference between the high-pressure portion 6 and the low-pressure portion 8 increases, resulting in a difference between the pressure acting on the outer peripheral surface 20*b* of the movable seal member 20 (the pressure of high-pressure fluid in the high-pressure portion 6) and the pressure acting on the inner peripheral surface 20*a*

(the pressure that decreases from the high pressure side to the low pressure side). When the radially inward force applied to the movable seal member 20 due to this pressure difference overcomes the radially outward biasing force by the biasing member 60, the movable seal member 20 moves to the radially inner position, and the clearance between the rotating part 2 and the movable seal member 20 (or seal fin 24) decreases (see FIGS. 2B and 3B). During load operation of the rotating machine 1 (e.g., during rated load operation), the pressure of the high-pressure fluid of the high-pressure portion 6 continues to act on the outer peripheral surface 20*b* of the movable seal member 20, and the above-described pressure difference is maintained, so the clearance between the rotating part 2 and the movable seal member 20 (or seal fin 24) remains small (see FIGS. 2B and 3B).

In some embodiments, for example, as shown in FIGS. 2A to 3B, the movable seal member 20 has a sliding surface 22 which is adjacent to the protruding portion 34 of the retention member 30 in the axial direction and is slidable on the protruding portion 34. The protruding portion 34 has a facing surface 35 which faces the sliding surface 22 of the movable seal member 20 in the axial direction. In other words, the sliding surface 22 of the movable seal member 20 and the facing surface 35 of the protruding portion 34 can slide against each other.

In the embodiment shown in FIGS. 2A to 3B, the protruding portion 34 of the retention member 30 is disposed in the axial direction closer to the low-pressure portion 8 than the sliding surface 22 of the movable seal member 20 (i.e., the sliding surface 22 of the movable seal member 20 is disposed closer to the high-pressure portion 6 than the protruding portion 34). Accordingly, during operation of the rotating machine 1, a force is applied to the movable seal member 20 from the high-pressure portion 6 to the low-pressure portion 8 in the axial direction due to the pressure difference between the high-pressure portion 6 and the low-pressure portion 8, causing the movable seal member 20 and the retention member 30 to slide against each other while the movable seal member 20 is pressed against the protruding portion 34 of the retention member 30.

In a conventional seal device, i.e., a seal device in which a movable seal member is accommodated in a groove in a stationary part (e.g., a stationary member such as a dummy ring or a retaining ring) of a rotating machine, when the movable seal member moves along the radial direction, the seal member and the stationary part (the stationary member with the groove receiving the seal member) slide against each other. As this sliding motion is repeated, wear occurs on the sliding surfaces of the seal member and the stationary part, and the condition of the sliding surfaces (friction coefficient, etc.) changes from the desired state. If the sliding surfaces change from the desired state, the operation of the movable seal member may deviate from expectations, such as the movable seal member not moving at the intended timing, and the operation of the seal device may become unstable. As a result, this may lead to reduced efficiency of the rotating machine and increased risk of contact between the seal member and the rotating part. It is also possible to maintain the condition of the sliding surfaces in the desired state by replacing worn parts, but the parts that cause wear (e.g., dummy ring and retaining ring) are large parts constituting the stationary part of the rotating machine, and such large parts may not be easily replaced due to cost or other reasons.

In this regard, in the above-described embodiment, the protruding portion 34 of the retention member 30 accommodated in the groove 5 in the stationary part 4 and the sliding surface 22 of the movable seal member 20 supported by the retention member 30 movably along the radial direction are adjacent to each other. Accordingly, when the movable seal member 20 moves along the radial direction, the sliding surface 22 of the movable seal member 20 and the protruding portion 34 of the retention member 30 slide against each other. Therefore, if wear occurs on the sliding portion (the sliding surface 22 of the movable seal member 20 and the protruding portion 34 of the retention member 30), the surface of the sliding portion can be maintained in a desired state (e.g., a state with a desired friction coefficient) by replacing the retention member 30 and/or the movable seal member 20. Thus, since it is easy to maintain the surface of the sliding portion in the desired state, it is easy to maintain a state where the movable seal member 20 operates stably in the rotating machine 1. In other words, it is easy to maintain stable operation of the seal device 10 in the rotating machine 1.

Further, in the above-described embodiment, the movable seal member 20 is biased radially outward against the retention member 30 accommodated in the groove 5 of the stationary part 4 by the biasing member 60. Thus, since the radially outward force is applied to the movable seal member 20 by the biasing member 60, the movable seal member 20 can move smoothly along the radial direction according to the operating state of the rotating machine 1.

Further, in the above-described embodiment, the movable seal member 20 is supported by the retention member 30 movably in the radial direction via the head part 52 and the shaft part 54 (bolt part) 50, and the radially outward force is applied to the movable seal member 20 by the biasing member 60 disposed between the head part 52 and the inner wall surface (surface 37) of the retention member 30 via the head part 52 and the shaft part 54 (bolt part 50). Thus, with a simple configuration using the head part 52 and the shaft part 54 (bolt part 50), the radially outward biasing force can be applied to the movable seal member 20 while the movable seal member 20 is supported movably along the radial direction.

In a conventional seal device (i.e., a sealing device without a retention member), a biasing member is disposed between the movable seal member and the stationary member in the radial direction to bias the movable seal member radially outward. Therefore, when the seal device is installed in a rotating machine, insertion of the movable seal member into the groove along the circumferential direction may be impeded by the preload (force along the radial direction) applied to the biasing member.

In this regard, in the above-described embodiment, the movable seal member 20 is supported by the retention member 30, and the biasing member 60 for biasing the movable seal member 20 radially outward is accommodated in the retention member 30. Therefore, by inserting the retention member 30 into the groove 5 of the stationary part 4 along the circumferential direction in a state where the movable seal member 20 and the biasing member 60 are assembled on the retention member 30, the seal device 10 including the movable seal member 20 can be installed in the rotating machine 1. Therefore, even when a relatively large preload is applied to the biasing member 60, the seal device 10 can be smoothly installed in the rotating machine 1 without the preload preventing the insertion of the seal device 10 into the groove.

Figure 4:
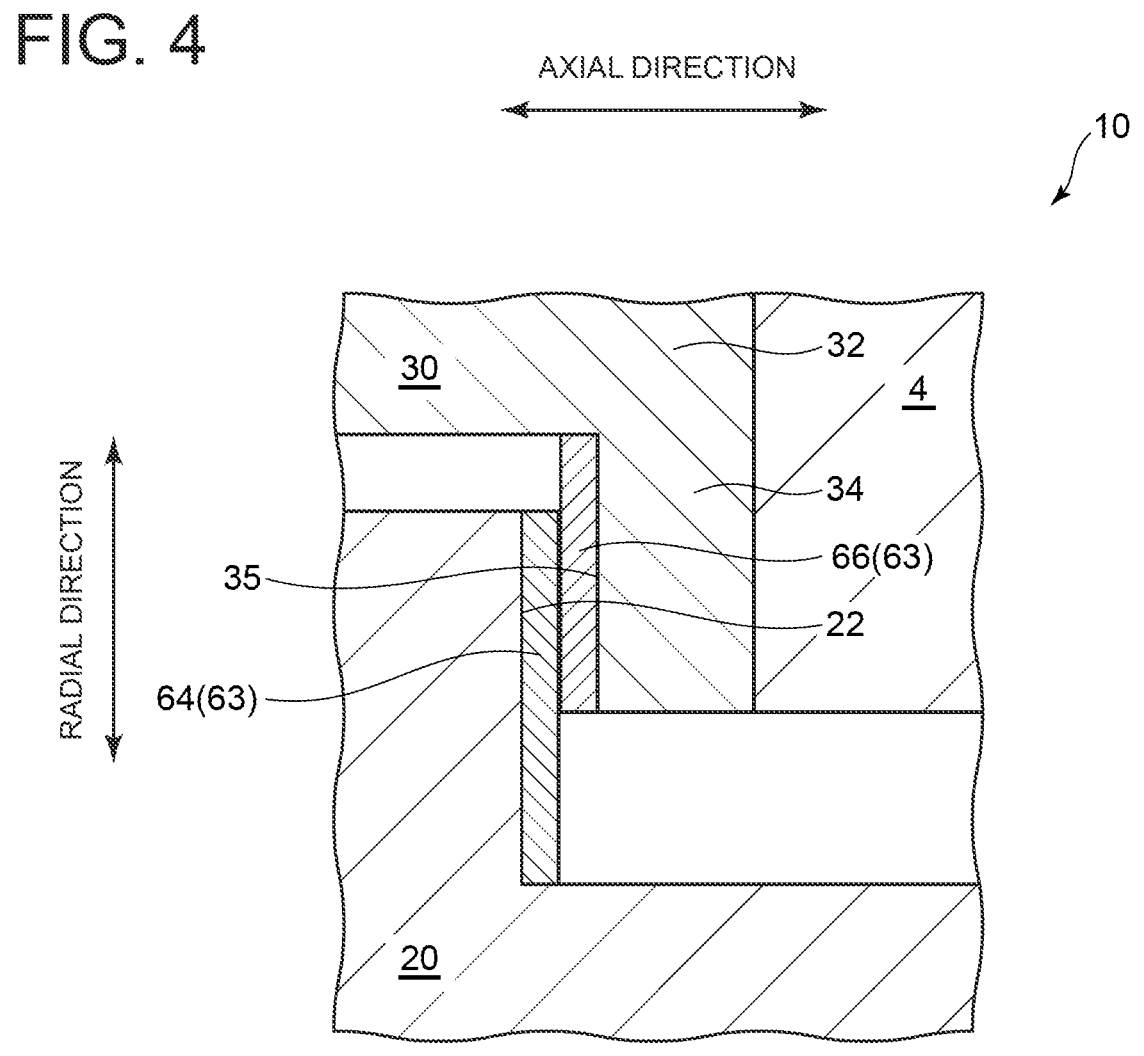
Figure 5:
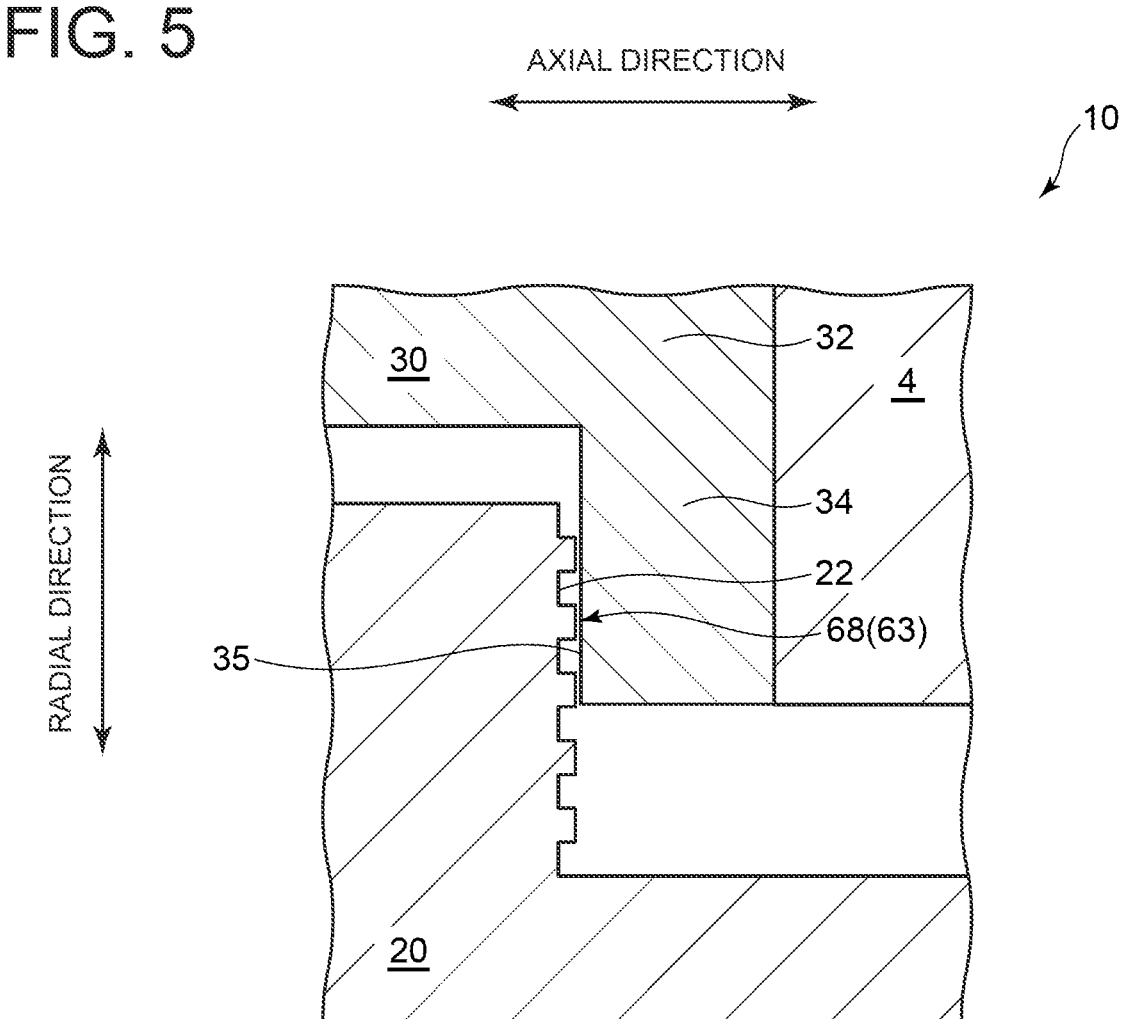
FIG. 5 is a schematic enlarged view of a sliding portion of the seal device according to an embodiment.

FIGS. 4 and 5 are each a schematic enlarged view of the sliding portion (protruding portion 34 of retention member 30 and portion of movable seal member 20) of the seal device 10 according to an embodiment. As shown in FIGS.

4 and 5, in some embodiments, the seal device 10 includes a friction reducing part 63, disposed on at least one of the sliding surface 22 of the movable seal member 20 or the facing surface 35 of the protruding portion 34 of the retention member 30, for reducing a friction between the sliding surface 22 and the facing surface 35.

According to the above-described embodiment, since the friction reducing part 63 (coating parts 64, 66 or texturing part 68, etc., which will be described later) for reducing a friction between the sliding surface 22 and the facing surface 35 is disposed on at least one of the sliding surface 22 of the movable seal member 20 or the facing surface 35 of the retention member 30, the surface of the sliding portion can be maintained in the desired state for a longer period of time without replacing the retention member 30 or the movable seal member 20. Additionally, since the movable seal member 20 and the retention member 30 are small compared to the stationary members constituting the stationary part 4, they are easy to treat, such as coating, texturing, or surface hardening treatment (e.g., blasting or shot peening) to provide the friction reducing part 63. Thus, since it is easier to maintain the surface of the sliding portion in the desired state, it is easier to maintain a state where the movable seal member 20 operates stably in the rotating machine 1.

In the exemplary embodiment shown in FIG. 4, the friction reducing part 63 includes a coating part 64 disposed on at least a portion of the sliding surface 22 of the movable seal member 20 and a coating part 66 disposed on at least a portion of the facing surface 35 of the protruding portion 34. In some embodiments, the friction reducing part 63 may include a coating part disposed on one of the sliding surface 22 of the movable seal member 20 or the facing surface 35 of the protruding portion 34.

The coating part on the sliding surface 22 of the movable seal member 20 or the facing surface 35 of the protruding portion 34 may be formed of a material including water, hydrocarbons, halogenated hydrocarbons such as chloroform or carbon tetrachloride, cyanated hydrocarbons such as acetonitrile, ketones such as acetone, ethers such as dioxane, saturated fatty acids, unsaturated fatty acids, or alcohols such as methanol or glycerin. Alternatively, the coating part may include a solid lubricant, such as boron nitride, for example.

When the coating parts 64, 66 are disposed on both the sliding surface 22 of the movable seal member 20 and the facing surface 35 of the protruding portion 34 (retention member 30) as shown in FIG. 4, the coating parts 66, 66 may be formed of a material including a hard coating material. The hard coating material may be Co—Cr—Mo alloy such as T800 or chrome carbide.

In the exemplary embodiment shown in FIG. 5, the friction reducing part 63 includes a texturing part 68 disposed on at least a portion of the sliding surface 22 of the movable seal member 20. The texturing part 68 may include fine irregularities on the sliding surface 22. In some embodiments, the friction reducing part 63 may include a texturing part (fine irregularities) disposed on the facing surface 35 of the protruding portion 34.

In some embodiments, the friction reducing part 63 may include a coating part disposed on one of the sliding surface 22 of the movable seal member 20 or the facing surface 35 of the protruding portion 34 and a texturing part disposed on the other of the sliding surface 22 of the movable seal member 20 or the facing surface 35 of the protruding portion 34.

In some embodiments, the friction reducing part 63 may include a surface hardening treatment part (not shown) on at least a portion of the sliding surface 22 of the movable seal member 20. The surface hardening treatment part may be obtained by blasting or shot peening at least a portion of the sliding surface 22 of the movable seal member 20. The surface that has undergone the surface hardening treatment such as blasting or shot peening becomes harder and has a smaller coefficient of friction than the surface that has not undergone such a treatment.

(Mounting Method for Seal Device)

In some embodiments, the seal device 10 is mounted on the rotating machine 1 by inserting the retention member 30 into the groove 5 provided in the stationary part 4 along the circumferential direction in a state where the movable seal member 20 is assembled on the retention member 30.

Thus, by inserting the retention member 30 into the groove 5 of the stationary part 4 along the circumferential direction in a state where the movable seal member 20 is assembled on the retention member 30, the seal device 10 including the movable seal member 20 can be installed on the rotating machine 1 appropriately.

In some embodiments, an existing seal device disposed in the groove 5 (groove extending along the circumferential direction) of the stationary part 4 of the rotating machine 1 may be removed, and then the retention member 30 may be inserted into the groove 5 (groove in which the existing seal device has been disposed) along the circumferential direction in a state where the movable seal member 20 different from the existing seal device is assembled on the retention member 30 to mount the seal device 10 (i.e., the seal device may be replaced). The existing seal device may not be the seal device 10 according to the above-described embodiment, and may be, for example, a seal device which does not include a retention member and in which a movable seal member is not retained by the retention member.

In some embodiments, the groove 5 extending along the circumferential direction may be machined in the stationary part 4 of an existing rotating machine 1, and then the retention member 30 may be inserted into the groove 5 machined in the stationary part 4 along the circumferential direction in a state where the movable seal member 20 is assembled on the retention member 30 to mount the seal device 10 (i.e., the rotating machine may be modified).

The contents described in the above embodiments would be understood as follows, for instance.

(1) A seal device (10) according to at least one embodiment of the present invention includes: a seal member (e.g., the above-described movable seal member 20) disposed between a rotating part (2) and a stationary part (4) of a rotating machine (1) in a radial direction of the rotating machine; and a retention member (30) for supporting the seal member movably along the radial direction, the retention member being at least partially accommodated in a groove (5) disposed in the stationary part so as to extend along a circumferential direction. The retention member has: a base portion (32) accommodated in the groove; and a protruding portion (34) protruding radially inward from the base portion. The seal member has a sliding surface (22) which is adjacent to the protruding portion in an axial direction and is slidable on the protruding portion.

In the above configuration (1), the protruding portion of the retention member accommodated in the groove in the stationary part and the sliding surface of the seal member supported by the retention member movably along the radial direction are adjacent to each other. Accordingly, when the seal member moves along the radial direction, the sliding surface of the seal member and the protruding portion of the retention member slide against each other. Therefore, if wear occurs on the sliding portion (the sliding surface of the seal member and the protruding portion of the retention member), the surface of the sliding portion can be maintained in a desired state by replacing the retention member and/or the seal member. Thus, since it is easy to maintain the surface of the sliding portion in the desired state, it is easy to maintain a state where the movable seal member operates stably in the rotating machine. In other words, it is easy to maintain stable operation of the seal device in the rotating machine.

(2) In some embodiments, in the above configuration (1), the seal device includes a biasing member (60) accommodated in the retention member and configured to bias the seal member radially outward against the retention member along the radial direction.

According to the above configuration (2), the seal member is biased radially outward against the retention member accommodated in the groove of the stationary part by the biasing member. This applies the radially outward force to the seal member, so that the seal member can move smoothly along the radial direction according to the operating state of the rotating machine.

(3) In some embodiments, in the above configuration (2), the seal device includes: a head part (52) accommodated in the retention member; and a shaft part (54) extending along the radial direction and connecting the head part and the seal member. The biasing member is disposed between a radially inward-facing surface (53) of the head part and a radially outward-facing surface (37) of an inner wall surface of the retention member.

According to the above configuration (3), the seal member is supported by the retention member movably in the radial direction via the head part and the shaft part, and the radially outward force is applied to the seal member by the biasing member disposed between the head part and the inner wall surface of the retention member via the head part and the shaft part. Thus, with a simple configuration using the head part and the shaft part, the radially outward biasing force can be applied to the seal member while the seal member is supported movably along the radial direction.

(4) In some embodiments, in any one of the above configurations (1) to (3), the seal member is disposed in the axial direction between a high-pressure portion (6) of the rotating machine through which a high-pressure fluid flows and a low-pressure portion (8) through which a low-pressure fluid with a lower pressure than the high-pressure fluid flows. The protruding portion of the retention member is disposed in the axial direction closer to the low-pressure portion than the sliding surface of the seal member.

During operation of the rotating machine, a force is applied to the seal member from the high-pressure portion to the low-pressure portion in the axial direction due to the pressure difference between the high-pressure portion and the low-pressure portion. In this regard, according to the above configuration (4), since the protruding portion of the retention member is disposed closer to the low-pressure portion than the sliding surface of the seal member, during operation of the rotating machine, the seal member and the retention member slide against each other while the seal member is pressed against the protruding portion of the retention member. Thus, even when the seal member and the retention member slide against each other while the seal member is pressed, as described in (1), since it is easy to maintain the surface of the sliding portion in the desired state, it is easy to maintain a state where the movable seal member operates stably in the rotating machine.

(5) In some embodiments, in any one of the above configurations (1) to (4), the seal member is disposed in the axial direction between a high-pressure portion of the rotating machine through which a high-pressure fluid flows and a low-pressure portion through which a low-pressure fluid with a lower pressure than the high-pressure fluid flows. The seal member has an outer peripheral surface (20b) on which a pressure of the fluid from the high-pressure portion acts.

According to the above configuration (5), since the seal member has the outer peripheral surface on which the pressure of the fluid from the high-pressure portion acts, during operation of the rotating machine, the pressure of the fluid from the high-pressure portion acts on the outer peripheral surface of the seal member. This applies the radially inward force to the seal member, so that the seal member can move smoothly along the radial direction according to the operating state of the rotating machine.

(6) In some embodiments, in any one of the above configurations (1) to (5), the seal device includes a friction reducing part (63), disposed on at least one of the sliding surface of the seal member or a facing surface of the protruding portion which faces the sliding surface and is slidable on the sliding surface, for reducing a friction between the sliding surface and the facing surface.

According to the above configuration (6), since the friction reducing part for reducing a friction between the sliding surface and the facing surface is disposed on at least one of the sliding surface of the seal member or the facing surface of the retention member, the surface of the sliding portion can be maintained in the desired state for a longer period of time without replacing the retention member or the seal member. Thus, since it is easier to maintain the surface of the sliding portion in the desired state, it is easier to maintain a state where the movable seal member operates stably in the rotating machine.

(7) A rotating machine according to at least one embodiment of the present invention includes: a rotating part (2) and a stationary part (4); and the seal device (10) described in any one of the above (1) to (6) for reducing leakage of a fluid between the rotating part and the stationary part.

In the above configuration (7), the protruding portion of the retention member accommodated in the groove in the stationary part and the sliding surface of the seal member supported by the retention member movably along the radial direction are adjacent to each other. Accordingly, when the seal member moves along the radial direction, the sliding surface of the seal member and the protruding portion of the retention member slide against each other. Therefore, if wear occurs on the sliding portion (the sliding surface of the seal member and the protruding portion of the retention member), the surface of the sliding portion can be maintained in a desired state by replacing the retention member and/or the seal member. Thus, since it is easy to maintain the surface of the sliding portion in the desired state, it is easy to maintain a state where the movable seal member operates stably in the rotating machine. In other words, it is easy to maintain stable operation of the seal device in the rotating machine.

(8) A mounting method for a seal device according to at least one embodiment of the present invention is a method for mounting the seal device described in any one of the above (1) to (6) on a rotating machine including a rotating part and a stationary part, including a step of inserting the retention member in the groove disposed in the stationary part along a circumferential direction in a state where the seal member is assembled on the retention member.

According to the above configuration (8), by inserting the retention member into the groove of the stationary part along the circumferential direction in a state where the seal member is assembled on the retention member, the seal device including the seal member can be installed on the rotating machine appropriately.

Embodiments of the present invention were described in detail above, but the present invention is not limited thereto, and various amendments and modifications may be implemented.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Rotating machine
2 Rotating part
4 Stationary part
4a Inner peripheral surface
5 Groove
6 High-pressure portion
7 Axially protruding portion
8 Low-pressure portion
10 Seal device
20 Movable seal member
20a Inner peripheral surface
20b Outer peripheral surface
21 Gap
22 Sliding surface
24 Seal fin
26 Threaded hole
28 Engagement portion
30 Retention member
31 Accommodation space
32 Base portion
33 Hole
34 Protruding portion
35 Facing surface
36 Contact portion
37 Surface
40 Fixed seal member
42 Biasing member
50 Bolt part
52 Head part
53 Surface
54 Shaft part
56 Thread
60 Biasing member

62 Disc spring
63 Friction reducing part
64 Coating part
66 Coating part
68 Texturing part
O Central axis

The invention claimed is:

1. A seal device, comprising:

a seal member configured to be disposed between a rotating part and a stationary part of a rotating machine in a radial direction of the rotating machine; and a retention member for supporting the seal member movably along the radial direction, the retention member being configured to be at least partially accommodated in a groove disposed in the stationary part so as to extend along a circumferential direction, wherein the retention member has:

a base portion for accommodation in the groove; and a protruding portion protruding radially inward from the base portion, and wherein the seal member has a sliding surface which is adjacent to the protruding portion in an axial direction and is slidable on the protruding portion, wherein the seal device comprises a biasing member accommodated in the retention member and configured to bias the seal member radially outward against the retention member along the radial direction, wherein the retention member includes a contact portion configured to contact an axially protruding portion of the stationary part, the axially protruding potion protruding in the axial direction in the groove, and wherein the biasing member is disposed radially outside of the contact portion.

2. The seal device according to claim 1, comprising:

a head part accommodated in the retention member; and a shaft part extending along the radial direction and connecting the head part and the seal member, wherein the biasing member is disposed between a radially inward-facing surface of the head part and a radially outward-facing surface of an inner wall surface of the retention member.

3. The seal device according to claim 1, wherein the seal member is disposed in the axial direction between a high-pressure portion of the rotating machine through which a high-pressure fluid flows and a low-pressure portion through which a low-pressure fluid with a lower pressure than the high-pressure fluid flows, and wherein the protruding portion of the retention member is disposed in the axial direction closer to the low-pressure portion than the sliding surface of the seal member.

4. The seal device according to claim 1, wherein the seal member is disposed in the axial direction between a high-pressure portion of the rotating machine through which a high-pressure fluid flows and a low-pressure portion through which a low-pressure fluid with a lower pressure than the high-pressure fluid flows, and wherein the seal member has an outer peripheral surface on which a pressure of the fluid from the high-pressure portion acts.

5. The seal device according to claim 1, comprising a friction reducing part, disposed on at least one of the sliding surface of the seal member or a facing surface of the protruding portion which faces the sliding surface and is slidable on the sliding surface, for reducing a friction between the sliding surface and the facing surface.

6. A rotating machine, comprising:

the seal device according to claim 1;

the rotating part; and the stationary part.

7. A mounting method for mounting the seal device according to claim 1 on a rotating machine including the rotating part and the stationary part, comprising a step of inserting the retention member in the groove disposed in the stationary part along a circumferential direction in a state where the seal member is assembled on the retention member so that the seal device is disposed between the rotating part and the stationary part in the radial direction.

8. The seal device according to claim 2, comprising a bolt part which includes the head part and the shaft part.

9. The seal device according to claim 8, wherein the head part is accommodated in the base portion so as to be movable in the radial direction.

10. The seal device according to claim 2, wherein the biasing member includes a disc spring through which the shaft part extends.

\* \* \* \* \*